Patented Aug. 7, 1934

1,969,299

UNITED STATES PATENT OFFICE 1,969,299

MANUFACTURE OF UREAS, AND SUBSTANCES OF A LIKE CHARACTER OF THE NAPHTHALENE SERIES

George Malcolm Dyson, Cheadle Hulme, and Arnold Renshaw, Manchester, England, assignors to Parke Davis and Company, Detroit, Mich., a corporation of Michigan No Drawing. Application January 16, 1929, Serial No. 333,020. In Great Britain February 1, 1928

17 Claims. (Cl. 260—124)

Our invention relates to a new process for the manufacture of ureids of the naphthalene series including in this term both ureas and thioureas.

We have found that by the action of the thionyl chloride, phosphorus pentachloride, phosphorus trichloride and similar substances upon dicarboxylic aryl ureas, or dicarboxylic aryl thioureas or their substitution products, a new series of aryl urea acid halides is produced; we have also found that similar substances may be produced by the action of thionyl chloride, or phosphorus chlorides upon aryl isocyanates or iso thiocyanates followed by treatment of the carbimide or thio-carbimide aryl acidyl halides so obtained with amino aryl carboxylic acids, amino carboxylic acid derivatives of quinoline, benzthiazole or the like, followed by further treatment with thionyl chloride.

In carrying out the process of our invention we may react diaryl urea acid halides, formed as above, with an amino-acenaphthene sulphonic acid or an amino-naphthalene sulphonic acid or with their substituents. The diaryl urea acid halides may also be reacted with the products obtained by reducing the nitro compounds obtained by the action on 1-amino-naphthalene sulphonic acids of chlorides of nitro-aryl fatty acids and nitro-aryl chlorides, nitro-aryl olefinic-carboxylic acid chlorides, nitro-aryl sulpho-chlorides or their substitution products, and in this way obtain symmetrical or unsymmetrical ureids which are of value as therapeutic agents or as intermediates for the production of colouring matters.

To form the substituted amino-naphthalene sulphonic acids, with which our diaryl urea acid halides can be reacted to form the ureids of our invention, we may react upon an amino-naphthalene sulphonic acid with a nitro-aryl chloride, for example 2-nitro-cinnamyl chloride (Berichte 16, 34, Beilstein 2, 1414, 3rd edition), 3-nitrocinnamyl chloride (German Patents 288,272 and 288,273), 4-nitrocinnamyl chloride (Berichte 1916, 49, 2688), 1-nitro-naphthalene-5-sulpho-chloride, 1,5-nitro-naphthoyl chloride, 2-nitrophenylacetyl chloride (Berichte 43, 2547), 4-nitrophenyl-acetyl chloride, nitrobenzoyl chlorides, nitroanisoyl chlorides, nitrotoluyl chlorides, nitrobenzene sulpho chlorides, chloro-nitrobenzoyl chlorides, bromonitrobenzoyl chlorides, iodonitro-benzoyl chlorides. The nitro groups in the reaction products of the above compounds with the amino-naphthalene sulphonic acids can be reduced to amino groups. The products can then be termed amino-arylido naphthalene sulphonic acids. These bodies reacted with our diaryl urea acid halides produce the ureids of our invention.

Among the aminonaphthalene sulphonic acids which can be used in our process there may be mentioned 1,8-aminonaphthol-3:6-disulphonic acid, 1-naphthylamine-4,8-disulphonic acid, 1-naphthylamine-4,6,8-tri-sulphonic acid, chloro-naphthylamine sulphonic acid, bromo- or iodo-naphthylamine sulphonic acids, obtained by halogenating naphthylamine sulphonic acids by known methods or by halogenating the acetyl-naphthylamine sulphonic acids by known methods and hydrolysing the products; alkoxy-naphthylamine sulphonic acids, 1,5-amino-naphthol-7-sulphonic acid, 2,8-amino-naphthol-3,6-disulphonic acid.

Among the amino-acenaphthene sulphonic acids which can be used in our invention, there may be mentioned 4-aminoacenaphthene-5-sulphonic acid—

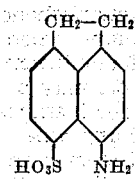

and 4-aminoacenaphthene-3-sulphonic acid (Fleischer and Schranz, Ber. 55, 3253 (1922), G. T. Morgan and V. E. Yarsley, Journal of the Society of Chemical Industry, 44, 513T (1925)), 4-aminoacenaphthene-3,5-disulphonic acid (G. T. Morgan and V. E. Yarsley, Journal of the Society of Chemical Industry, 44, 513T (1925)), and 4-aminoacenaphthene-trisulphonic acids, obtained by further sulphonation of 4-aminoacenaphthene-5-sulphonic acid with oleum or of 4-nitroacenaphthene-5-sulphonic acid with oleum and reduction of the NO₂ group.

To form the ureids of our invention we may advantageously use a urea or thiourea diaryl dicarboxylic acid as a starting material. Examples of these bodies, which can be used in our process, are: symmetrical diphenylurea 3,3'-dicarboxylic acid, s-benzthiazolyl-phenyl urea 3,5' dicarboxylic acid, as-diphenyl urea 3,3' dicarboxylic acid, s-4'-quinolyl phenyl urea 3,6' dicarboxylic acid:—

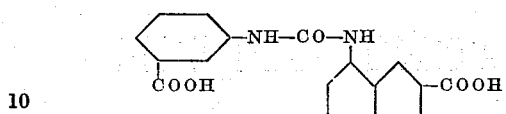

s-α-2-methoxy phenyl-β-4-nitro phenyl urea 3:3' dicarboxylic acid:

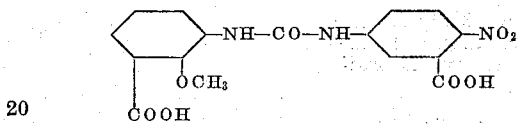

These urea or thiourea diaryl dicarboxylic acids may be represented by the following probable generic formula:

in which either $R_1$ or $R_2$ represents hydrogen, the other representing a carboxyl substituted aryl nucleus, $R_3$ represents a carboxyl substituted aryl nucleus, X represents S or O, and in which the aryl nuclei may be further substituted. These urea or thiourea diaryl dicarboxylic acids are treated with thionyl chloride, phosphorus pentachloride or phosphorus trichloride to form the corresponding acid chloride. The latter is then reacted with a primary aryl amine or advantageously with an amino-naphthalene sulphonic acid or an amino-acenaphthene sulphonic acid or an amino-arylido-naphthalene sulphonic acid to form the ureids of our invention.

The finished products may be purified in any suitable manner, as, for instance, by solution in glacial acetic acid, or any other suitable solvent, and precipitation of the substance from solution by acetone, ether or other suitable precipitant.

As an example of this synthetic process the following manner of preparing a urea compound is cited:—

*Example.*—m-aminobenzoic acid is dissolved in a dilute aqueous solution of caustic soda and phosgene gas passed into the solution so obtained which may be artificially cooled; or, alternatively, the solution of sodium m-aminobenzoate is treated with a solution of phosgene in an inert solvent such as tetrachlorethane or toluene; or, alternatively, the m-aminobenzoic acid may be dissolved in a mixture of non-aqueous solvents of which pyridine forms a component part, and treated with phosgene alone or in solution. In each case, the compound diphenyl urea-3:3'-dicarboxylic acid separates and is removed and dried.

The dry diphenylurea 3,3' dicarboxylic acid is heated with thionyl chloride in excess until solution is complete. The excess of thionyl chloride is removed by distillation (with or without an inert liquid such as benzene) and the residual diphenyl-urea-3,3' dicarboxylic acid chloride (1 mol.) is stirred for several hours with an aqueous solution of the sodium salt of m-aminoparatoluyl naphthylamine-4,6,8-trisulphonic acid (0.9 mol.) with or without the addition of a mild alkali such as sodium carbonate, or sodium acetate, until the solution ceases to give a red coloration when treated with sodium nitrite, hydrochloric acid and resorcinol. The solution is filtered from tar, evaporated to dryness, preferably in vacuum, and extracted with methyl alcohol, the clear methyl alcoholic solution is poured into a large bulk of absolute ethyl alcohol and the precipitated compound filtered off and dried.

The reactions taking place in the foregoing example may be illustrated as follows:—

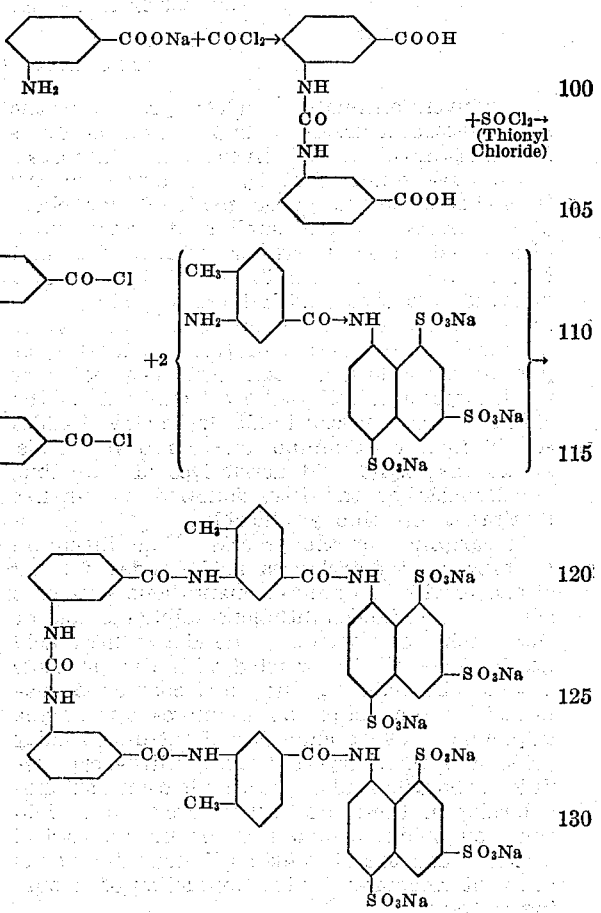

The process and reactions with the thioureas are similar.

What we claim and desire to secure by Letters Patent is:—

1. The manufacture of a symmetrical urea derivative by dissolving m-aminobenzoic acid in a dilute aqueous solution of caustic soda, passing phosgene gas into the solution, heating the dry diphenyl-urea-3,3'-dicarboxylic acid obtained with thionyl chloride in excess, removing the excess of thionyl chloride, stirring the residual diphenyl-urea-3,3'-dicarboxylic acid chloride with an aqueous solution of the sodium salt of m-aminotoluyl- naphthylamine - 4,6,8 - trisulphonic acid, purifying, and extracting with methyl alcohol and separating the urea derivative by precipitation in absolute ethyl alcohol.

2. In the manufacture of open ring ureids, the process which comprises forming a diaryl urea acid chlorides from a compound having the general formula:

in which either $R_1$ or $R_2$ represents hydrogen, the other representing a mono-carboxyl substituted phenyl nucleus, $R_3$ represents a monocarboxyl substituted phenyl nucleus, X represents S or O, and reacting said diaryl urea acid chloride with a compound selected from a group consisting of amino-naphthalene sulphonic acids, amino-arylido-naphthalene sulphonic acids and amino-acenaphthene sulphonic acids.

3. In the manufacture of open ring ureids, the process which comprises forming a diaryl urea acid chloride from a compound having the general formula:

in which either $R_1$ or $R_2$ represents hydrogen, the other representing a monocarboxyl substituted phenyl nucleus, $R_3$ represents a monocarboxyl substituted phenyl nucleus, and reacting said diaryl urea acid chloride with a compound selected from a group consisting of amino-naphthalene sulphonic acids, amino-arylido-naphthalene sulphonic acids and aminoacenaphthene sulphonic acids.

4. In the manufacture of open ring ureids, the process which comprises forming a diaryl urea acid chloride from a compound having the general formula:

in which either $R_1$ or $R_2$ represents hydrogen, the other representing a monocarboxyl substituted phenyl nucleus, $R_3$ represents a monocarboxyl substituted phenyl nucleus, X represents S or O, and reacting said diaryl urea acid chloride with an amino-arylido-naphthalene sulphonic acid.

5. In the manufacture of open ring ureids, the process which comprises forming a diaryl urea and acid chlorid from a compound having the general formula:

in which either $R_1$ or $R_2$ represents hydrogen, the other representing a carboxyl substituted phenyl nucleus, $R_3$ represents a monocarboxyl substituted phenyl nucleus, X represents S or O, and reacting said diaryl urea acid chloride with m-amino-para-toluyl naphthylamine-4:6:8-trisulphonic acid.

6. In the manufacture of open ring ureids, the process which comprises forming a diaryl urea acid chloride from a compound having the general formula:

in which either $R_1$ or $R_2$ represents hydrogen, the other representing a mono carboxyl substituted phenyl nucleus, $R_3$ represents a mono carboxyl substituted phenyl nucleus, X represents S or O, and reacting said diaryl urea acid chloride with a primary aryl amine.

7. In the manufacture of open ring ureids, the step which consists in reacting with thionyl chloride upon diphenyl-dicarboxyl-ureas.

8. The manufacture of open ring ureids by a process which comprises first converting a dicarboxylic aryl urea into the corresponding acid chloride and then reacting such acid chloride with a primary aryl amine in which the aryl is one of the group consisting of acenaphthene and naphthalene.

9. The process of preparing complex ureas which comprises converting a dicarboxylic aryl urea into the corresponding di-acyl halide and then reacting such acyl halide with a primary aryl amine.

10. The process of preparing urea polyamides which comprises converting a dicarboxyl phenyl urea into the corresponding di-acyl halide and then reacting such acyl halide with an amino derivative of an amide to yield a urea polyamide.

11. A new process for the manufacture of complex urea derivatives involving the condensation of dicarboxy urea derivatives of the type

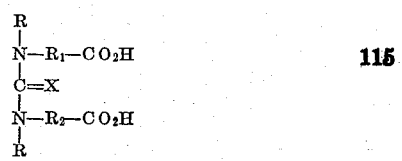

in which X represents sulphur or oxygen, R represents hydrogen or alkyl, and $R_1$ and $R_2$ represent aryl nuclei, with aryl amines of the class consisting of amino-acenaphthene sulphonic acids and aminonaphthalene sulphonic acids to yield urea amides.

12. A new process for the manufacture of complex urea derivatives involving the condensation of dicarboxy urea derivatives of the type

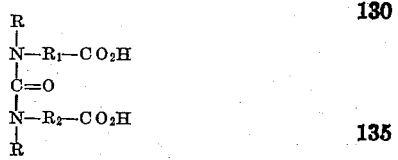

in which R represents hydrogen or alkyl, and $R_1$ and $R_2$ represent aryl nuclei, with aryl amines of the class consisting of amino-acenaphthene sulphonic acids and aminonaphthalene sulphonic acids to yield urea amides.

13. A new process for the manufacture of complex urea derivatives involving the condensation of dicarboxy urea derivatives with compounds of the type

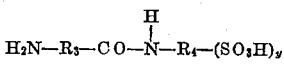

where $R_3$ and $R_4$ represent nuclei of the class consisting of phenyl and naphthyl nuclei and $y$ is not more than 3.

14. The process comprising converting a compound of the class consisting of a urea diaryl dicarboxylic acid and a thiourea diaryl dicarboxylic acid into the corresponding di-acyl halide and reacting said halide with an aryl amine.

15. The process comprising converting a compound of the class consisting of a urea diaryl dicarboxylic acid and a thiourea diaryl dicarboxylic acid into the corresponding di-acyl halide and reacting said halide with a compound of the class consisting of aminonaphthalene sulphonic acids and the salts thereof.

16. The process of preparing ureids of the naphthalene series comprising reacting a diaryl urea di-acid halide with an aminonaphthalene sulphonic acid.

17. The process comprising converting a compound having the formula

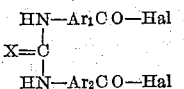

with a compound having the formula $$NH_2-AR_3$$

thereby obtaining a compound having the formula

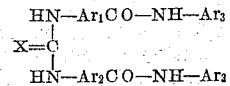

where X is O or S, $Ar_1$, $Ar_2$ and $Ar_3$ are aromatic nuclei and Hal is halogen.

GEORGE MALCOLM DYSON.
ARNOLD RENSHAW.